United States Patent [19]

Sanders

[11] Patent Number: 4,709,399
[45] Date of Patent: Nov. 24, 1987

[54] OPENING FACILITATING CLOSURE TAPE AND CONTAINER

[75] Inventor: Bernard Sanders, Jersey, Channel Islands

[73] Assignee: Beiersdorf A.G., Hamburg, Fed. Rep. of Germany

[21] Appl. No.: 928,718

[22] Filed: Nov. 13, 1986

Related U.S. Application Data

[63] Continuation of Ser. No. 644,174, Aug. 23, 1984, abandoned.

[30] Foreign Application Priority Data

Aug. 25, 1983 [GB] United Kingdom ............... 8322885

[51] Int. Cl.⁴ .............................. B65D 33/20
[52] U.S. Cl. ..................... 383/66; 206/633; 206/813; 229/485 B; 229/79; 229/80; 383/5; 383/84
[58] Field of Search ............... 206/438, 439, 631–633, 206/613, 807, 813; 229/79, 80, 48 S B, 48 S A; 383/5, 59, 66, 81, 84, 95, 99, 78, 47, 51, 52

[56] References Cited

U.S. PATENT DOCUMENTS

| | | | |
|---|---|---|---|
| 2,394,335 | 2/1946 | Shapiro | 383/84 X |
| 3,151,803 | 10/1969 | Kaminski | 383/66 X |
| 3,257,228 | 6/1966 | Reed. | |
| 3,387,766 | 6/1968 | Kugler | 383/66 X |
| 4,041,202 | 8/1977 | Williams | 206/631 X |
| 4,093,073 | 6/1978 | Leezer | 206/633 X |
| 4,417,658 | 11/1983 | Gardner et al. | 383/66 X |
| 4,509,196 | 4/1985 | Sak et al. | 383/5 |

FOREIGN PATENT DOCUMENTS

| | | |
|---|---|---|
| 774969 | 1/1968 | Canada. |
| 952487 | 8/1974 | Canada. |
| 2045760 | 3/1972 | Fed. Rep. of Germany. |
| 2729020 | 1/1979 | Fed. Rep. of Germany. |
| 1128152 | 1/1957 | France. |
| 2189276 | 1/1974 | France. |
| 2345355 | 10/1977 | France. |
| 916266 | 1/1963 | United Kingdom. |
| 1436489 | 5/1976 | United Kingdom. |

Primary Examiner—Stephen Marcus
Assistant Examiner—Bryon Gehman
Attorney, Agent, or Firm—Neuman, Williams, Anderson & Olson

[57] ABSTRACT

A container of synthetic plastics film material is provided with a re-sealable closure in the form of a re-usable adhesive tape which bridges an opening so as to form an airtight closure. The container is opened by peeling the tape from a surface with which the tape is in contact and the container is re-closed by reapplying the tape to the surface.

3 Claims, 25 Drawing Figures

OPENING FACILITATING CLOSURE TAPE AND CONTAINER

This application is a continuation of application Ser. No. 644,174, filed Aug. 23, 1984, now abandoned.

BACKGROUND OF THE INVENTION

1. Field of the Invention

This invention relates to containers, and more specifically, to containers made of synthetic plastics film material.

2. Description of the Prior Art

It is known to manufacture flexible containers in large quantity and at low cost from synthetic plastics film material and to provide such containers each with a closure comprising pressure sensitive contact adhesive for uniting one to another adjacent surfaces of an opening of the container. Generally, the closure is in the form of a flap which is united with an opposite facing surface of the container by means of the adhesive.

A convenient method of providing pressure sensitive contact adhesive to form closures for containers is to apply adhesive tape to material from which the containers are to be manufactured, the tape thereby being incorporated in the finally formed containers such that portions of the tape comprise the closure of the containers.

Such containers generally comprise front and rear panels united one to another in spaced substantially parallel seams, one of the panels having a line of separation extending substantially orthogonal to the seams and a tape applied by a pressure sensitive contact adhesive to the said one panel so as to extend longitudinally of and bridge the line, the adhesive being separable in relation to a surface in contact therewith.

In French Pat. No. 2,345,355 (Janowski), for example, there is proposed a method of manufacturing tamper evident containers of synthetic plastics film material in which the material is in the form of a web and is advanced through a machine in a direction parallel to a longitudinal axis of the web. The web is folded longitudinally, is slit longitudinally, is provided with an adhesive tape which extends longitudinally of and bridges the slit and the web subsequently is provided with spaced transversely extending rows of perforations. Finally, the web is slit and welded in spaced transverse welds providing spaced substantially parallel seams adjacent corresponding rows of perforations in completed containers thereby formed by the slitting and welding process. A portion of an adhesive coating of the tape provides closure means for the completed bags.

A serious disadvantage of the method proposed in French Pat. No. 2,345,355 is that, in order to carry out the method, it would be necessary to modify extensively existing machinery whereby such machinery would be provided with means for accurately providing the transversely extending rows of perforations.

A further disadvantage of containers manufactured in accordance with French Pat. No. 2,345,355 is that, although the spaced parallel rows of perforations define a flap which would be separated from adjacent portions and peeled away therefrom to open a container and thereby provide a tamper evident feature, the container would not be air tight when closed because air would pass freely into the interior of the container through the perforations. In consequence, the containers could not be used for packaging of items adversely affected by ingress of air.

SUMMARY OF THE INVENTION

It is an object, therefore, to provide flexible containers having closure means provided by pressure sensitive contact adhesive which can be manufactured on existing machinery with no, or minimal, modification necessary to the machinery and wherein the containers, when closed, are substantially air tight.

In the present invention the aforementioned object is achieved through a container with a panel having an opening location and a tape applied by a pressure sensitive contact adhesive to the said panel so as to bridge the opening location. The tape and the adhesive are of greater dimension than the opening location so as to provide a substantially air tight closure, and the adhesive is re-usable such that the tape is separably unitable in a controlled manner with the surface of the panel, whereby the closure is adapted to be opened and reclosed repeatedly.

The term "opening location" may comprise a series of tear perforations or serrations or slits or a continuous slit, slot or line of weakening or cuts comprising a series of saw-tooth configurations. The term "pressure sensitive contact adhesive" includes cohesive surfaces which are characterized in that the surfaces adhere substantially only to one another when located in contact with one another.

In consequence, it is unnecessary to provide material of which the container is formed with rows of perforations extending parallel to seams to define a flap, with the attendant disadvantage that air would enter the container through the perforations.

BRIEF DESCRIPTION OF THE DRAWINGS

For a more complete understanding of this invention, reference should now be made to the embodiments illustrated in greater detail in the accompanying drawings and described below by way of examples of the invention. In the drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS INCLUDING PREFERRED EMBODIMENTS

Figure 1:
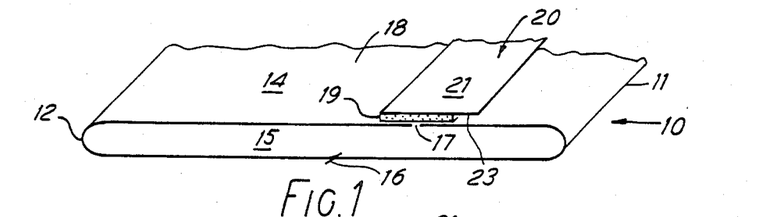
FIG. 1 is a diagrammatic view shown partly in cross section of one embodiment of a container in accordance with the present invention, the container being in a closed condition and being shown in a storage position turned through 90° from a position in which the container would normally be oriented when being opened and closed.
Figure 2:
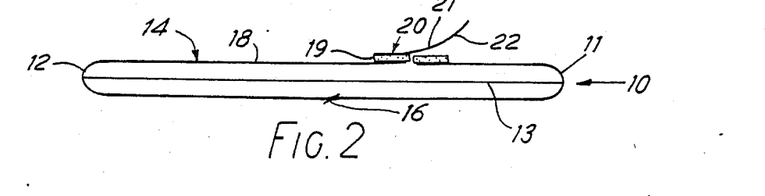
FIG. 2 is a diagrammatic cross section of the container shown in FIG. 1 when being opened while in the storage position.

Referring now to FIGS. 1 and 2 of the drawings, there is shown a container 10 of synthetic plastics film material having upper and lower spaced substantially parallel folds 11, 12 and spaced substantially parallel side welds, one of which is shown at 13, extending at right angles to the upper and lower folds 11, 12 defining a front panel 14 and a rear panel 15. The rear panel is provided with a back seal 16 extending substantially parallel to the upper and lower folds 11, 12 and substantially mid-way between the folds. The front panel 14 is provided with a slit 17 extending substantially parallel to the upper and lower folds 11, 12 and being located in a direction from one to the other of the side welds 13 nearer the upper fold 11 than the lower fold 12. The front panel 14 has an outer surface 18 to which is applied an adhesive coating 19 of a pressure sensitive contact adhesive tape 20, the adhesive bridging the slit 17 and extending longitudinally thereof throughout the whole length of the slit 17 from one to the other of the side welds 13. The tape 20 comprises a substrate 21 having a surface 22 which carries the adhesive coating 19. The adhesive 19 extends on the surface 22 for the full length of the substrate 21 and in a direction transversely of the substrate from one marginal edge thereof to a location spaced transversely inwardly from an opposite marginal edge thereof to provide a finger tab 23 extending longitudinally of the tape 20.

The container 10 is opened by grasping the finger tab 23 and pulling the tab away from an adjacent surface of the front panel 14. The action of turning the tab 23 away from the front panel 14 causes the substrate 21 to peel from the adhesive 19 in a direction towards the lower fold 12, the peeling action continuing as far as the slit 17 when the adhesive coating 19 separates into two portions, an upper portion having been separated from the substrate 21 and remaining on the outer surface 18 of the front panel 14 and a lower portion continuing to unite the substrate 21 and the portion of the frent panel 14 below the slit 17. The division of the adhesive coating 19 results from the reaction of the upper surface 18 of the front panel 14 above the slit 17 to the force applied to the finger tab 23 no longer being present once the action of peeling the tape 20 in a direction from the upper fold 11 towards the lower fold 12 coincides with the slit 17. In consequence, the adhesive 19 is split, as shown in FIG. 2, and the continuing force applied to the finger tab 23 results in the portion of the front panel 14 below the slit 17 being pulled away from the rear panel 15 thereby effecting opening of the container 10 at the slit 17.

The container 10 is re-closed by releasing the force applied to the finger tab 23 and re-uniting the surface 22 of the substrate 21 with the portion of the adhesive 19 remaining on the outer surface 18 of the front panel 14 above the slit 17, this being possible due to the "re-usable" characteristics of the adhesive 19 whereby the container 10 can be opened and re-closed and repeatedly re-opened and re-closed.

Figure 3:
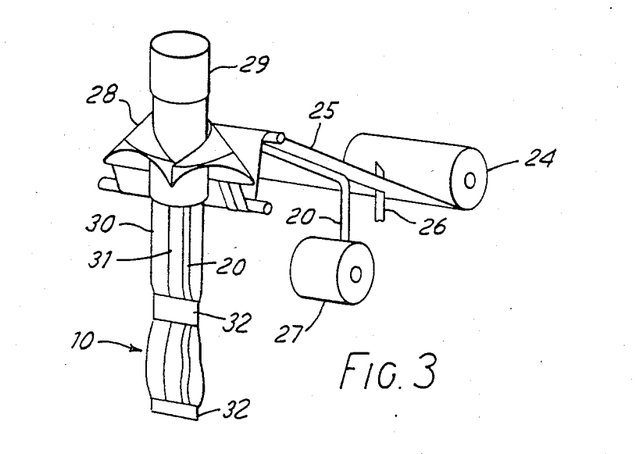
FIG. 3 is a diagrammatic representation of a method of manufacturing containers as shown in FIGS. 1 and 2.

Referring now to FIG. 3 of the drawings, there is shown a diagrammatic representation of a method of manufacturing containers shown in FIGS. 1 and 2. The method is carried out on a form/fill/seal machine on which is rotatably mounted a reel 24 in the form of a wound web 25 of synthetic plastics film material. The web 25 is unwound from the reel 24 on the machine and is slit longitudinally by means of a blade 26 as the web 25 moves in a longitudinal direction away from the reel 24, thereby forming the slit 17. The adhesive tape 20, which is bobbin wound to form a reel 27 located below the web 25, is progressively unwound from the reel 27 and applied longitudinally to a lower surface of the web 25 such that the tape bridges the slit 17.

The web 25 having the tape 20 applied thereto subsequently is guided around a former 28 extending circumferentially of a tubular member 29 whereby the web 25 is formed into a configuration of a tube 30, a central longitudinal axis of which is in line with a central longitudinal axis of the tubular member 29 and opposite longitudinally extending marginal portions of the web 25 overlapping one another and being sealed one to another in a back seal 31 extending longitudinally of the tube 30.

The tube 30 is advanced incrementally in a downward longitudinal direction and is engaged by cooperating jaws (not shown) operation of which is synchronized with movement of the tube 30 so as to provide spaced transversely extending seams 32 and simultaneously sever the material of the tube 30 in a direction transverse to a longitudinal axis of the tube and midway through each seam 32, thereby providing a plurality of containers 10. Products to be packaged are inserted through the tubular member 29 in synchronism with movement of the tube 30 such that a product, or a predetermined number of products, are contained within each completed container 10.

The web 25 may be treated, for example by subjecting the web to electric corona discharge, so that the surface thereof destined to receive the adhesive tape 20 is "keyed" so as to receive the adhesive 19 of the tape 20. Such "keying" of the surface of the web 25 assists in ensuring that a portion of the adhesive 19 is separated from the surface 22 of the tape 20, as shown in FIG. 2, when the container 10 is being opened.

Figure 4:
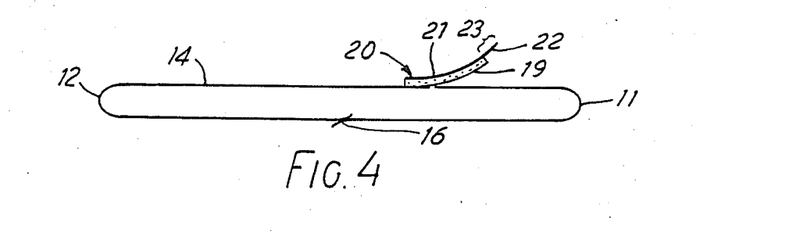
FIG. 4 is a diagrammatic cross section similar to FIG. 2 of another embodiment of a container in accordance with the present invention when being opened.

Alternatively, the surface 22 of the substrate 21 of the tape 20 may be treated, such as by subjecting the surface to electric corona discharge or to application of a primer coating, so as to provide a "key" for reception of the adhesive 19. In such a case, when a finger tab 23 of the tape 20 is pulled away from the front panel 14, the adhesive 19 remains in contact with the surface 22 of the substrate, as shown in FIG. 4, and is not transferred from the surface 22 to the front panel 14 in the manner illustrated in FIG. 2. However, as the tape 20 is peeled towards the lower fold 12 and is removed from the portion of the front panel 14 above the slit 17, the portion of the front panel 14 below the slit 17 is pulled away from the rear panel 15 by the force acting on the tape 20, thereby opening the container. As with the embodiment illustrated in FIG. 2, the adhesive 19 is re-usable and, therefore, the container is re-closed by re-uniting the adhesive 19 with the portion of the front panel 14 above the slit 17.

Figure 5:
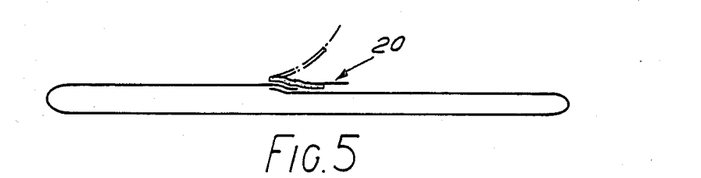
FIG. 5 is a diagrammatic cross section of a third embodiment of a container in accordance with the present invention.

Referring now to FIG. 5 of the drawings, there is shown a configuration wherein the web 25 is not slit longitudinally and the tape 20 is located adjacent a longitudinal marginal edge portion thereof so as to overlap the marginal edge. The arrangement is such that, as the opposite marginal edge portions of the web 25 overlap one another on passing from the former 28, the overlapping portions are not sealed one to another by a back seal 31 but are united one with another by means of the tape 20, as shown in FIG. 5. In this manner, it is unnecessary to provide a back seal 31, which is normally effected by heat sealing the overlapping marginal portions of the web 25 and which generally is of unreliable quality.

Figure 6:
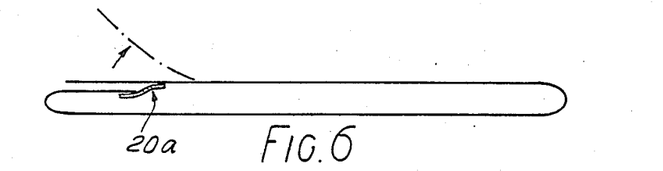
FIG. 6 is a diagrammatic cross section of a fourth embodiment of a container in accordance with the present invention.
Figure 7:
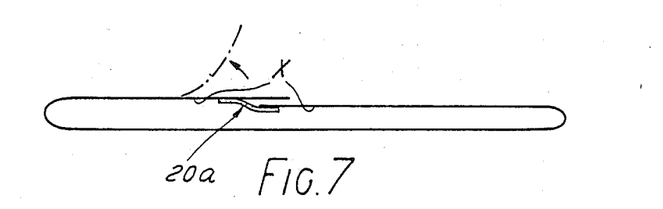
FIG. 7 is a diagrammatic cross section of a fifth embodiment of a container in accordance with the present invention.

Instead of being applied to the lower surface of the web 25, a tape 20a having no finger tab 23 may be applied to an upper surface thereof from the reel 27 located above the web 25. With such an arrangement, the tape 20a would be located inside completed containers, as shown in FIGS. 6 and 7. The configuration shown in FIG. 7 corresponds with the configuration shown in FIG. 5 and the configuration shown in FIG. 6 is formed by means of a modified former 28 whereby marginal longitudinal edge portions of the web 25 are arranged to overlap one another at a location nearer a longitudinal fold of the tube 30 than an opposite longitudinal fold of the tube.

Figure 8:
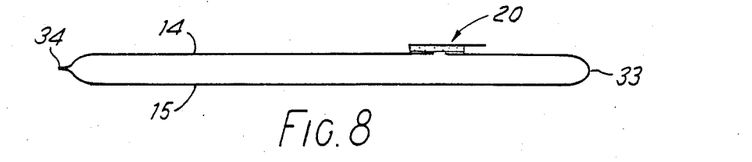
FIG. 8 is a diagrammatic cross section of a sixth embodiment of a container in accordance with the present invention.
Figure 9:
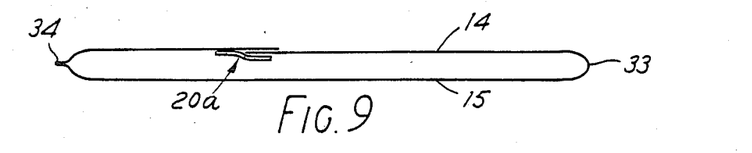
FIG. 9 is a diagrammatic cross section of a seventh embodiment of a container in accordance with the present invention.

Referring now to FIGS. 8 and 9 of the drawings, each of the figures shows an embodiment of a container manufactured from a sheet of synthetic plastics film material which is slit and which has applied thereto either the tape 20 having the finger tube 23 or the tape 20a which is not provided with a finger tab. With regard to the embodiment shown in FIG. 8, the tape 20 is used and is applied to an upper surface of the sheet such that the adhesive 19 of the tape 20 bridges the slit. With regard to the embodiment shown in FIG. 9, after the sheet has been slit, one or both of the portions of the slit sheet is, or are, moved laterally of the longitudinal axis of the slit so that margins of the portions overlap one another. The tape 20a then is applied to lower surfaces of the portions so as to bridge the gap therebetween. Subsequently, the sheet in both of the embodiments shown in FIGS. 8 and 9 is folded, as shown at 33, about an axis extending substantially parallel to the longitudinal axis of the tape 20 so as to form front and rear panels 14, 15. The front and rear panels are sealed one to another in spaced, substantially parallel side seams (not shown) extending at right angles to the fold 33.

Contents are inserted into the containers through an opening remote from the fold 33 and the front and rear panels 14, 15 subsequently are welded one to another in a weld 34 extending substantially parallel to the fold 33.

In each of the embodiments described above, the adhesive 19 comprises a single strip extending longitudinally of the substrate 21. However, it will be appreciated that the adhesive 19 may be applied to the substrate 21 as a configuration of one or more spaced substantially parallel longitudinal strips arranged such that, in use, the strips extend on either side of the slit 17.

It will also be appreciated that a second finger tab may be provided adjacent a margin of the substrate 21 remote from the finger tab 23.

In each of the embodiments described above and illustrated in FIGS. 1, 2, 4 and 8, a "tamper evident" feature may be provided by printing inficia on the front panel 14 on opposite sides of the slit 17, the indicia on one side of the slit 17 being in register with corresponding indicia on an opposite side of the slit. After a container provided with such indicia has been opened, it is difficult to re-close the container such that the indicia on one side of the slit 17 is in register with indicia on the opposite side of the slit. The inability to ensure such registration provides an indication that the container has been opened.

It will also be appreciated that, instead of providing the slit 17, the material which is to be formed into a container may be provided with a row of perforations. In such a case, the effect of pulling the tape away from the front panel of a container to open the container would sever the portions of the material bridging adjacent perforations in the row of perforations thereby opening the container. Since the bridge portions are severed on opening a container, the provision of perforations in the material from which the container is manufactured results in the container having a "tamper evident" closure.

A further advantage in providing a row of perforations instead of a slit 17 is that air which may pass between the tape 20 and the front panel of a container at the side seams 13 thereof will not pass longitudinally of the tape and downwardly through the perforations into the container because the passage of air would be blocked by adhesive contact between the adhesive 19 of the tape 20 and the bridge portions between the perforations.

Figure 10:
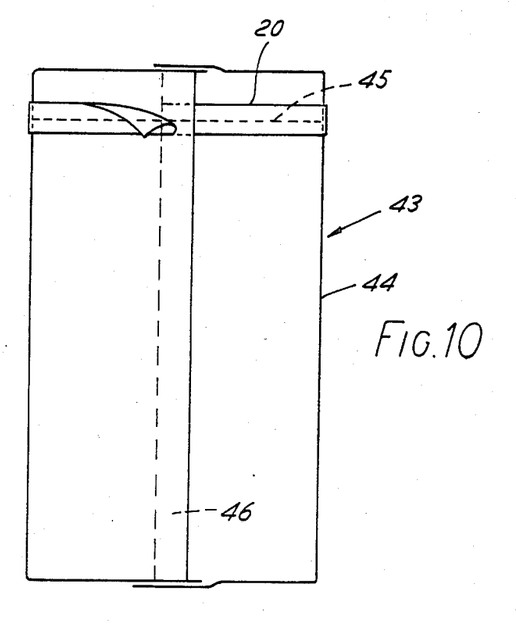
FIG. 10 is a plan view of an eighth embodiment of a container in accordance with the present invention.
Figure 11:
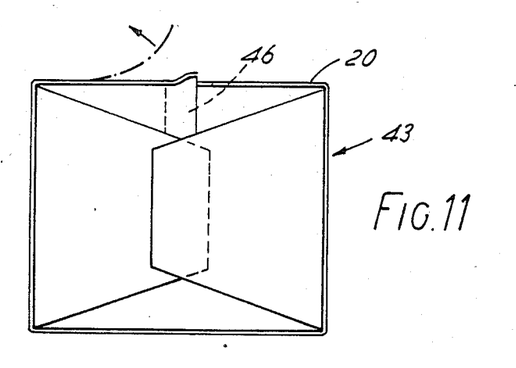
FIG. 11 is an elevation of the embodiment of the container shown in FIG. 10.

Referring now to FIGS. 10 and 11 of the drawings, there is shown a packaging article 43 wherein the packaging comprises a substantially rectangular sheet 44 which is slit in a line 45 extending substantially parallel to and adjacent an edge of the sheet and a lower surface of the sheet having applied thereto a tape 20 which extends longitudinally of the slit 45 whereby the adhesive 19 of the tape bridges the slit 45. The sheet 44 is folded around the packaged article such that opposite marginal edge portions extending at right angles to the longitudinal axis of the slit 45 are in register one with another and the edge portions are sealed one to another to provide a seal 46. The dimensions of the sheet 44 in a longitudinal direction of the seal 46 are greater than the corresponding dimensions of the article such that end portions of the sheet 44 extend beyond corresponding ends of the article. The end portions are folded inwardly against the article in envelope folds, as shown in FIG. 11, and are sealed one to another.

In use, the wrapper 43 is opened by grasping the finger tab 23 of the tape 20 and pulling the tab away from an adjacent surface of the sheet 44 whereby the tape 20 separates from the adjacent surface of the sheet 44 progressively in a longitudinal direction of the tape 20 and on one side of the slit 45. In this manner, an end portion of the wrapper is disconnected from the remaining portion thereof.

If the wrapper 43 envelops a number of articles, such as biscuits, one or more such biscuits may be removed and the portions of the sheet 44 substantially re-aligned to reform the slit 45. The tape 20 then can be re-positioned whereby the remaining articles are re-wrapped to a similar condition as existed before the wrapper was first opened.

It will be appreciated that the material of the tape 20 may be such as to provide gas and moisture barrier characteristics which are at least as effective as the material of the panels 14, 15, 38, 39.

Figure 12:
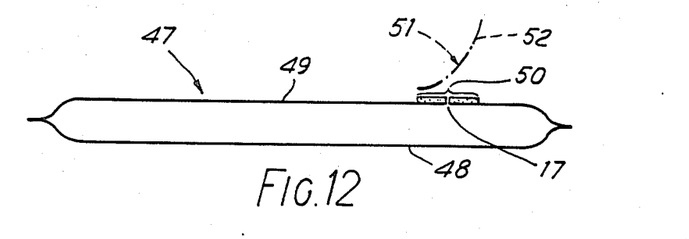
FIG. 12 is a diagrammatic cross section of a ninth embodiment of a container in accordance with the present invention showing the container in the process of being opened.
Figure 13:
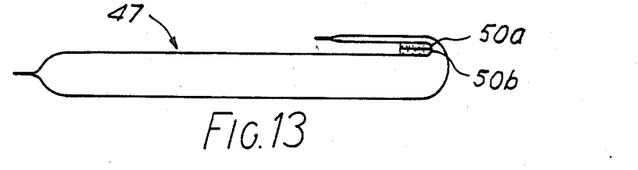
FIG. 13 is a diagrammatic cross section of the container shown in FIG. 12 when closed after having been opened.

Referring now to FIGS. 12 and 13 of the drawings, there is shown a container 47 comprising a rear panel 48 and a front panel 49. The front panel 49 is provided with a slit 17 which is bridged by an adhesive tape comprising pressure sensitive contact adhesive 50 and a carrier strip 51. The carrier strip 51 has a surface 52 thereof for receiving the adhesive 50, the surface 52 being coated with a release substance, such as silicone, prior to application of the adhesive 50 thereon.

In use, the carrier strip 51 is peeled from the adhesive 50 and the container 47 is opened at the slit 17, thereby separating the adhesive into two areas 50a and 50b. After some of the contents have been removed from the container 47 or the whole of the contents removed and subsequently re-inserted in the container, a neck portion of the container between the adhesive 50 and an adjacent end portion of the container is folded on the front panel 49 such that the two areas 50a and 50b engage one another and seal the container.

The adhesive 50 may be re-usable whereby the container 47 once closed in the manner illustrated in FIG. 13 may be re-opened, by peeling the folded portion of the container from the front panel 49 and thereby separating the areas 50a and 50b of adhesive one from another. The container 47 may be re-closed in the manner illustrated in FIG. 13.

Alternatively, the adhesive 50 may be such that it adheres only to itself or a similar adhesive. When the container is opened at the slit 17, the contents of the container are poured through the slit 17 and do not contaminate, and are not contaminated ty, the adhesive 50 due to the characteristics of the adhesive. However, when the container is closed or re-closed, as shown in FIG. 13, the surfaces of the portions 50a, 50b, being cohesive one with another, adhere one to another.

It will be appreciated that the adhesive 50 bridges the slit 17 prior to initial opening of the container and subsequent to removal of the carrier strip 51. In this manner, there is provided a tamper evident feature since the necessity of having to rupture the adhesive 50 longitudinally of the slit 17 to effect opening of the container reveals evidence of the container having been opened.

Figure 14:
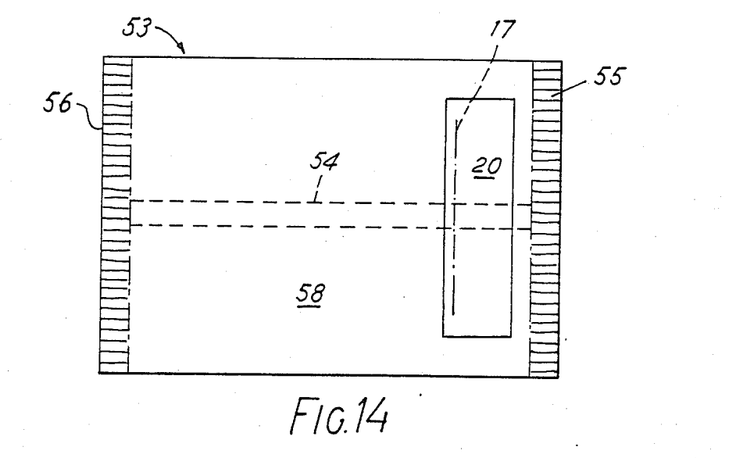
FIG. 14 is a plan view of the rear of a tenth embodiment of a container in accordance with the present invention.
Figure 15:
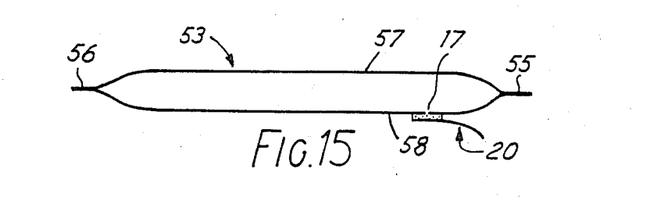
FIG. 15 is a diagrammatic cross section of the container shown in FIG. 14.

Referring now to FIGS. 14 and 15 of the drawings, there is shown a container 53 formed from a web of flexible material, opposite longitudinal marginal edge portions of which are sealed one to another to form a longitudinal seal 54 to contain an article (not shown) and which web is severed and sealed transversely in spaced parallel seals 55, 56 whereby the container 53 is of substantially flattened configuration having a rear panel 57 and a front panel 58. The front panel 58 is provided with a slit 17 which is bridged by an adhesive tape 20. The longitudinal dimension of the tape 20 is greater than the length of the slit 17 so that the tape 20 extends beyond opposite ends of the slit but is substantially less than the transverse dimension of the container 53.

The container 53 is opened and closed in the manner described above with reference to FIGS. 1 and 2 or FIG. 4.

Figure 16:
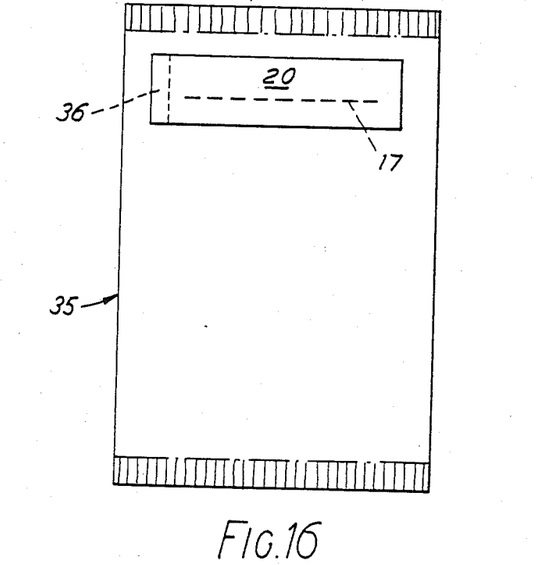
FIG. 16 is a view similar to FIG. 14 of an eleventh embodiment of a container in accordance with the present invention.
Figure 17:
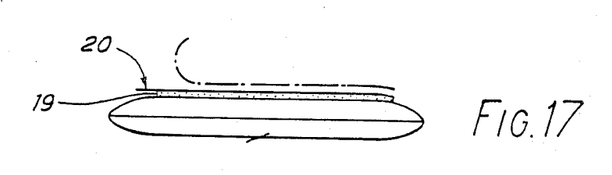
FIG. 17 is a diagrammatic cross section of the container shown in FIG. 16.

Referring now to FIGS. 16 and 17 of the drawings, there is shown a container 35 similar to the container 53 in FIGS. 14 and 15 except that the tape 20 of the container 35 is provided with a finger tab 36 at one end portion of the tape 20 instead of extending longitudinally of the tape as with the finger tab 23. Apart from extending transversely of the tape 20, the finger tab 36 is similar to the finger tab 23.

The tape 20 is removed from the container 35 by grasping the finger tab 36 and peeling the tape in a longitudinal direction, as shown in FIG. 17.

Figures 18, 19:
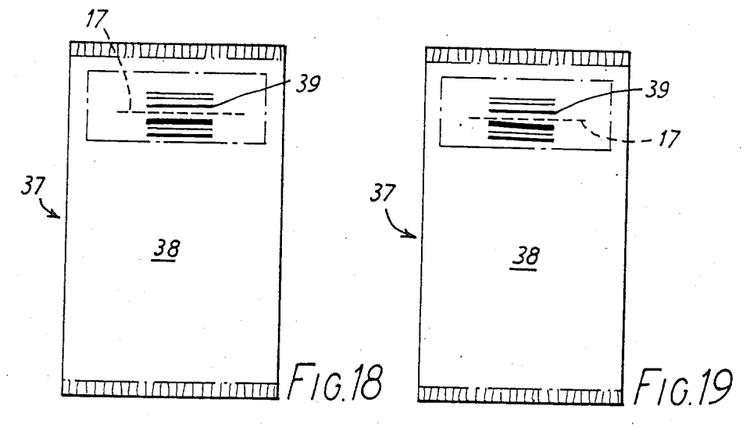
FIG. 18 is a view similar to FIG. 16 of a twelfth embodiment of a container in arcordance with the present invention, the container being shown prior to initial opening thereof.
FIG. 19 is a view of the container shown in FIG. 18 after the container has been opened and re-closed.

Referring now to FIG. 18 of the drawings, there is shown a container 37, which may be similar to the container 53 or 35 having a tape with a longitudinal finger tab 23 (as with the container 53) or with a transverse finger tab 36 (as with the container 35) which bridges a slit 17 in a panel 38 of the container 37.

The panel 38 is provided with indicia 39 in the form of elongate stripes extending parallel, or substantially parallel, one to another and to the slit 17 or at an angle to the slit, some of the stripes being located on one side of the slit 17 and the others of the stripes being located on an opposite side of the slit 17. The arrangement of the stripes and the spaces therebetween is such as to provide a coded signal when there is relative movement between the container 37 and an optical scanner located juxtaposed the stripes and spaces and when the scanner is set to receive signals for a "bar code" formed by such stripes and spaces.

The arrangement of the stripes and spaces comprising the bar code being located on opposite sides of the slit 17 provides for a tamper evident feature because, once the container 37 has been opened and re-closed, the stripes do not all extend substantially parallel one to another and/or the spacing of adjacent stripes on opposite sides of the slit 17 is not identical to the spacing before the container 37 initially was opened. In consequence, reading of the bar code by an optical scanner subsequent to re-closing the container will result in the scanner generating a signal indicating an unsatisfactory code signal.

In each of the embodiments referred to above in which a tape 20 is provided with a finger tab 23, the tab 23 is provided by zone coating the material of the substrate 21 with the adhesive coating 19 thereby providing a coated zone having the adhesive 19 and an uncoated zone clear of adhesive.

Although such a tab 23 may be quite satisfactory in use, it may be desirable to provide a finger tab 23 which is thicker in transverse cross section than the unit cross sectional dimension of the substrate 21 so as to facilitate ease of location of and grasping of the tab.

Figure 20:
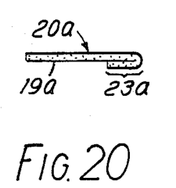
FIGS. 20 to 23 inclusive are diagrammatic cross sections of different embodiments of adhesive tapes which may be included in the construction of a container in accordance with the present invention.
Figure 21:
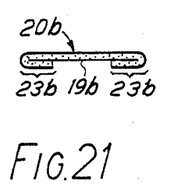
Figure 22:
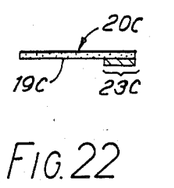
Figure 23:
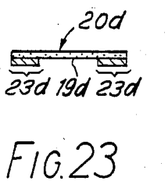

In FIG. 20, for example, a marginal portion of a tape 20a, one surface of which is wholly coated with pressure sensitive contact adhesive 19a, is folded longitudinally adjacent a marginal edge portion thereof to provide finger tab 23a. In FIG. 21 there is shown a tape 20b, one surface of which is wholly coated with pressure sensitive contact adhesive 19b, opposite longitudinal margins of which are folded towards one another to provide a pair of substantially parallel finger tabs 23b. The embodiment shown in FIGS. 22 and 23 correspond to the embodiments shown in FIGS. 20 and 21, respectively, except that the finger tabs 23c and 23d, respectively, are provided by adhering additional material to the adhesive 19c, 19d, respectively.

Each of the tapes 20, 20a, 20b, 20c or 20d may be an adhesive transfer tape or an adhesive non-transfer tape.

The finger tabs 23a, 23b, 23c or 23d may be formed prior to reeling of the associated tape 20a, 20b, 20c or 20d which may subsequently be bobbin wound or, alternatively, may be formed subsequent to unwinding and immediately prior to application to a surface.

It will be appreciated that providing an adhesive tape with a finger tab formed without having to ensure that a portion of the substrate of the tape is clear of adhesive eliminates the need for zone coating or adhesive stripping equipment.

Figure 24:
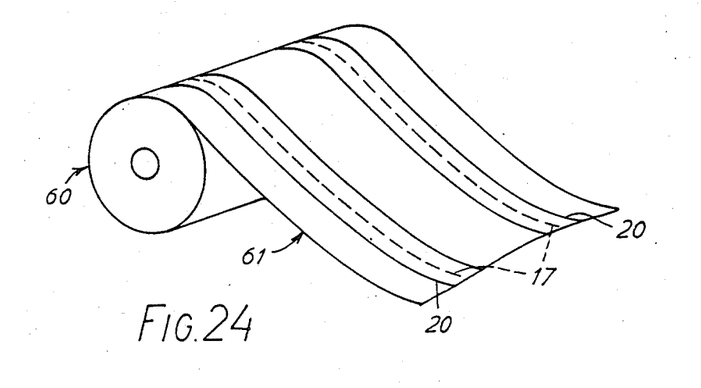
FIG. 24 is a diagrammatic representation of one embodiment of a reel material adapted for manufacture of containers in accordance with the present invention.

Referring now to FIG. 24 of the drawings, there is shown a reel 60 of a film 61 of synthetic plastics film material which is slit longitudinally to provide two spaced slits 17 each being covered by a corresponding one of a pair of tapes 20. The reel 60 would be presented to a packaging machine having the features illustrated in FIG. 3 but without the provision of the blade 26 and a dispenser for supplying the tape 20. The reel 60 would be installed on a machine in substitution for the reel 24 shown in FIG. 3 and would be fed through the machine such that, on operation of the machine, the material would be converted into formed, filled and sealed containers having any of the configurations shown in FIGS. 1, 2, 4 or 5 to 9.

Figure 25:
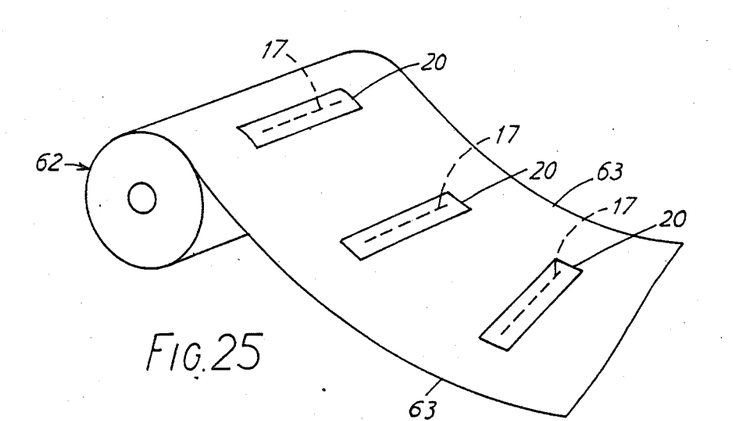
FIG. 25 is a diagrammatic representation of another embodiment of a reel of material adapted for manufacture of containers in accordance with the present invention.

In FIG. 25 of the drawings there is shown a reel 62 of a film 63 of synthetic plastics film material which is slit in spaced parallel slits 17 extending transversely of the material, each slit being of a longitudinal dimension less than the transverse dimension of the film 63 and each being covered by a corresponding one of a plurality of tapes 20 which extend longitudinally of the corresponding slits 17 and transversely of the film 63.

The reel 62 would be presented to a packaging machine which would be operable to convert the film 63 into filled containers having the configuration shown in any of FIGS. 12, 13, 14, 16, 17, 18 or 19.

The tapes 20 may be cut from a web (not shown) having a transverse dimension corresponding to the longitudinal dimension of each of the tapes 20. The web is advanced incrementally and is slit repetitively in synchronism with the repetitive advance of the web, each slit of the web being in a transverse direction of the web thereby providing sequentially a seriee of tapes 20 which are applied to the film 63 at predetermined intervals so that application of the tapes coincides with the slits 17 during relative movement of the web and the film 63.

While only certain embodiments have been set forth, alternative embodiments and various modifications will be apparent from the above description to those skilled in the art. For example, it will be appreciated that, in each of the embodiments described above, each container may be provided with two slits extending in spaced substantially parallel relation one to another and the application of a tape 20 relative to the slits bridges the transverse dimension between the slits. The arrangement may be such that, when the tape 20 is peeled from the container, the material between the slits 17 is removed with the tape thereby removing a panel of the container. These and other alternatives are considered equivalents and within the spirit and scope of the present invention.

What is claimed is:

1. An easily openable container comprising a panel having an elongate opening location and a tape applied by a pressure sensitive contact adhesive to a surface of said panel so as to bridge the opening location, said tape and said adhesive being of greater dimension than the opening location so as to provide a substantially airtight closure and the adhesive being re-usable such that the tape is separately unitable in a controlled manner with the surface of the panel, said container including means for allowing said tape to be peeled from said surface in a transverse direction of the opening location and the tape to release and separate from the adhesive only as far as the opening location so that the continued movement in the transverse direction causes opening of the container at the opening location.

2. A container as in claim 1, wherein the opening location comprises a plurality of frangible portions which are severed when the tape is separated from the surface of said panel.

3. A container as in claim 1, wherein the adhesive is rupturable on opening of the container thereby providing tamper evidence.

* * * * *